INVENTORS
RUSSELL W. CHICK
JAMES CHRISTOFFERSON
GEORGE F. VIGNEAU
BY

*Philip J. McFarland*
ATTORNEY

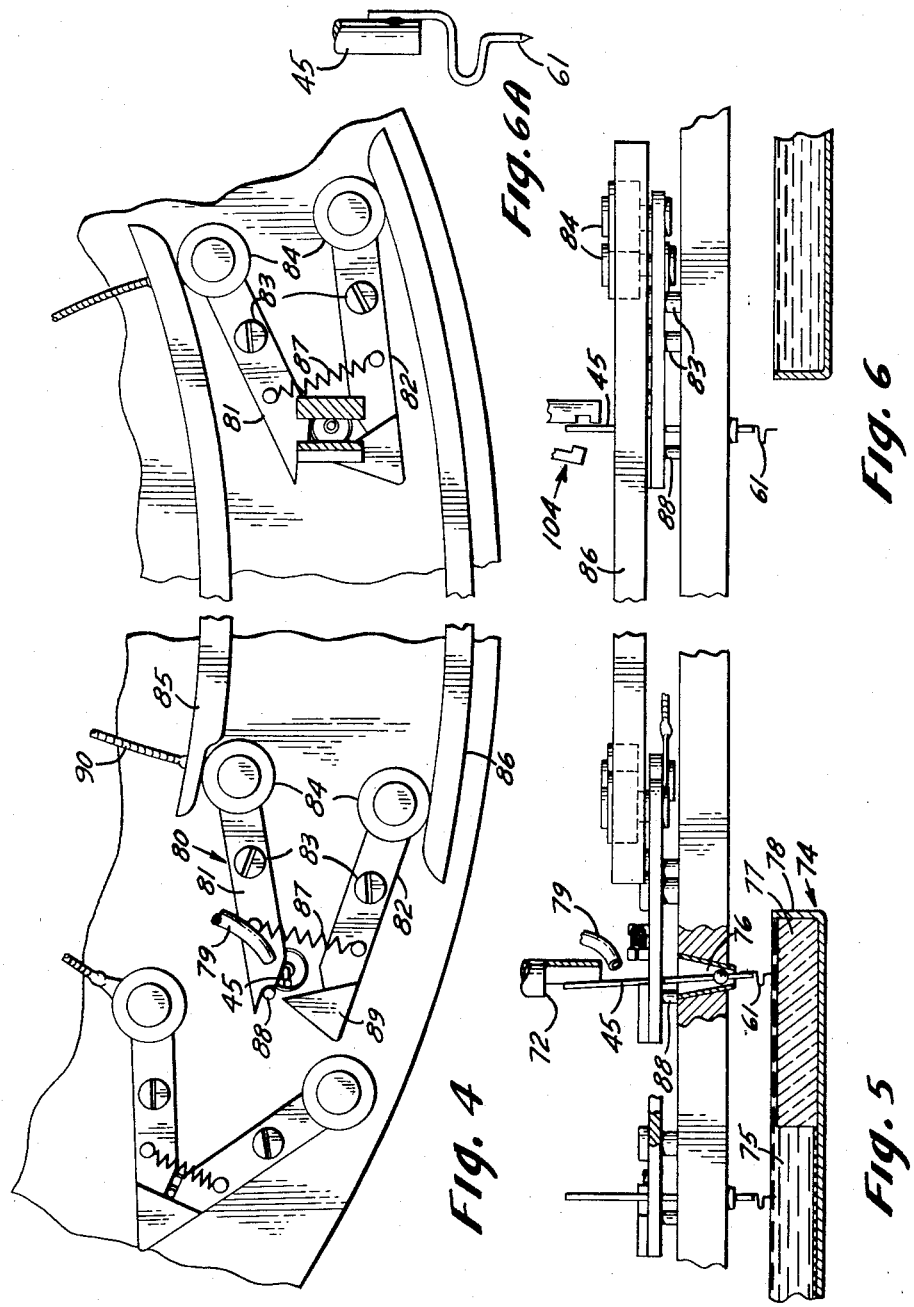

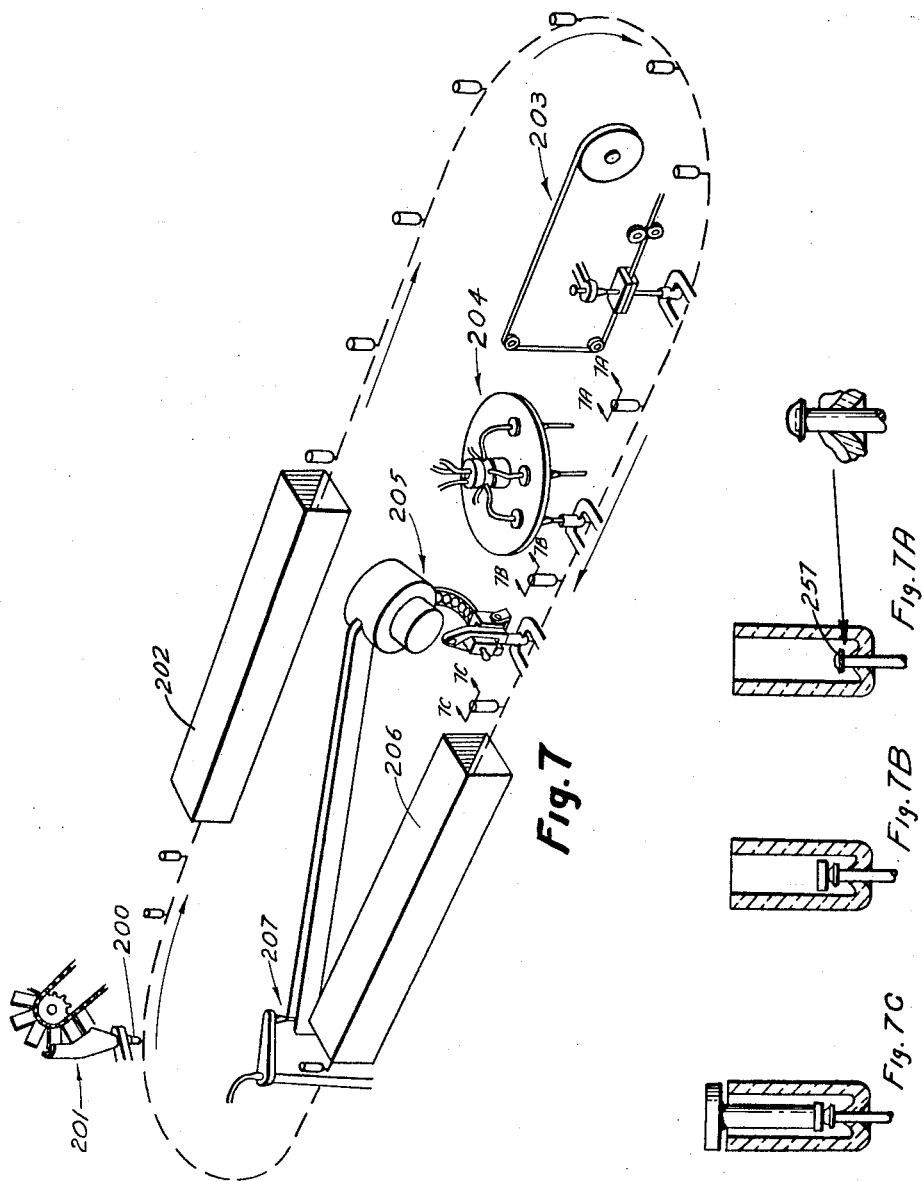

Aug. 7, 1962 R. W. CHICK ETAL 3,047,933
CRYSTAL DIODE ASSEMBLY MACHINE AND METHOD THEREFOR
Filed Jan. 17, 1958 10 Sheets-Sheet 6

INVENTORS
RUSSELL W. CHICK
JAMES CHRISTOFFERSON
BY GEORGE VIGNEAU

Philip J. McFarland
ATTORNEY

Aug. 7, 1962  R. W. CHICK ETAL  3,047,933
CRYSTAL DIODE ASSEMBLY MACHINE AND METHOD THEREFOR
Filed Jan. 17, 1958  10 Sheets-Sheet 8

INVENTORS
RUSSELL W. CHICK
JAMES CHRISTOFFERSON
GEORGE VIGNEAU
BY

ATTORNEY

//  # United States Patent Office 3,047,933
Patented Aug. 7, 1962

3,047,933
CRYSTAL DIODE ASSEMBLY MACHINE AND METHOD THEREFOR
Russell W. Chick, Beverly, and James Christofferson, West Newbury, Mass., and George F. Vigneau, Hampton Falls, N.H., assignors to Columbia Broadcasting System, Inc., Danvers, Mass., a corporation of New York
Filed Jan. 17, 1958, Ser. No. 709,544
5 Claims. (Cl. 29—25.3)

The invention generally pertains to semiconductor devices and particularly to an improved method and machine for automatically assembling and hermetically sealing such devices.

Various machines and methods have been developed to make semiconductor devices, especially point-contact diodes. While such diodes require a relatively few number of parts, the positioning of certain of the required parts is so critical that no presently known automatic machine or method is completely satisfactory. Difficulty is experienced especially when hermetic sealing of a point-contact diode is desired. Such sealing is satisfactorily effected only when an impermeable covering, such as a glass envelope, is used. However, known glasses may be sealed only by subjecting the entire assembly to relatively high temperatures, making changes in the electrical characteristics of the semiconductor material probable unless extreme care is taken.

The size of the elements in commonly used point-contact diodes is also a source of difficulty. For example, the semiconductor material is usually formed into a wafer of the order of .040" square and .020" thick (or less). The rectifying contact-making member, or whisker, consists of a wire about .005" in diameter having a sharp pointed end. This end of the whisker must be precisely placed on the semiconductor material so that a certain predetermined pressure exists between the two parts. If one were to depend only on machine precision, normal wear would prevent holding the required range of pressure without adjustment of the machine.

When hermetic sealing and adjusting of the pressure of the whisker on the wafer is attempted simultaneously, the problem of accomplishing both objects together is even more difficult. On the one hand, high temperature is required to effect a seal with materials such as glass, yet, on the other hand, oxidation of the semiconductor material is accelerated by such temperatures. While it would be possible to effect the seal in a non-oxidizing atmosphere as has been done in the past, a great amount of care must be exercised. In addition, special equipment and techniques must be used. It is obviously better to perform the sealing operation quickly enough to prevent any substantial amount of oxidation from occurring.

Because of the small size of the semiconductor wafers now commonly used, a handling problem occurs. When large numbers of wafers are required, as to supply a production line or an automatic assembly machine, selection of individual wafers is a tedious and time-consuming process. Moreover, it is absolutely essential that there be no damage done to any of the wafers, such as scratching or chipping. Unless extreme care is exercised, scratching or chipping is almost certain to occur.

An object of the invention is to provide a complete and automatic semiconductor device assembly machine;

Another object of the invention is to provide a novel and improved method of assembling and hermetically sealing semiconductor devices;

Another object of the invention is to provide apparatus for positioning the elements of a semiconductor device in proper spatial relationship regardless of variations in size of these elements;

Still another object of the invention is to provide apparatus for separating individual wafers of semiconductor wafers from a conglomerate mass.

In general, the objects of the invention are attained by providing apparatus for forming all the parts required to make a hermetically sealed point-contact semiconductor device (except for the semiconductor material itself which may be made in any known way) and using such apparatus in a certain way to obtain the desired results. Thus, a lead-in wire is formed and sealed, preferably through a glass bead, to a glass envelope. After the lead-in wire has been cleaned, a measured amount of solid solder is formed around the end of the lead-in wire projecting inside of the envelope. A semiconductor wafer is then placed on top of the solder and a relatively large weight is placed on top of the wafer. This combination is then heated to solder the lead-in wire and the semiconductor wafer together. At the same time, a whisker assembly is being formed by sealing another lead-in wire to another glass bead, welding a whisker to the lead-in wire and etching the free end of the whisker to a sharp point. The whisker and the assembly carrying the semiconductor wafer are then assembled together with the correct pressure between the whisker and the semiconductor wafer and then a seal between the glass bead on the lead-in wire supporting the whisker and the free end of the glass envelope is quickly made. For a better understanding of the invention, together with other and further obejcts, features and advantages, reference should be made to the following description which is to be read in connection with the accompanying drawings in which:

FIG. 2A is a view of a whisker assembly made on the machinery shown in FIG. 2;

FIG. 4 is a plan view of the loading and unloading sections of the apparatus shown in FIG. 3;

FIG. 5 is a cross-sectional view taken along the plane 5—5 of FIG. 4;

FIG. 6 is a cross-sectional view taken along the plane 6—6 of FIG. 4;

FIG. 6A is an enlarged view of the whisker assembly shown in FIG. 6;

FIG. 7 is a partially schematic plan view of apparatus for assembling a semiconductor wafer in a glass envelope;

FIGS. 7A, 7B and 7C show the appearance of the assembly shown in FIG. 7 at various points therein;

Figure 10:
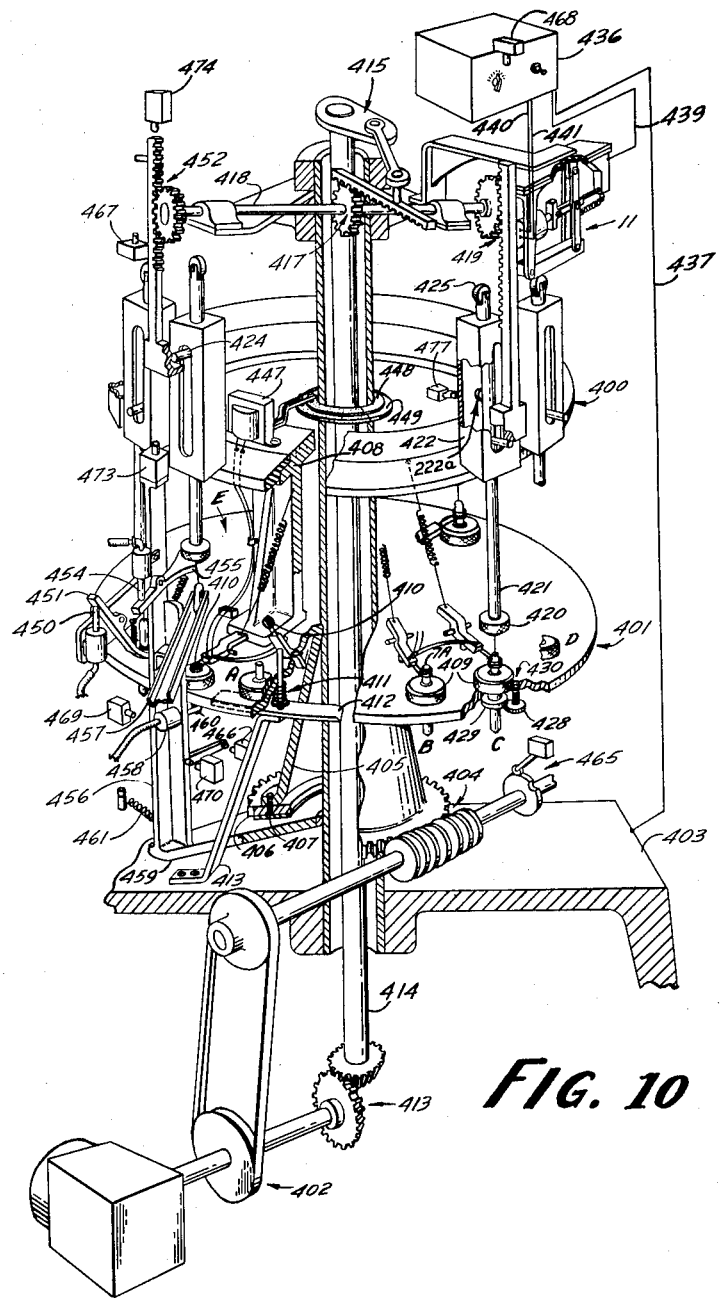
FIG. 10 is a perspective view of assembly apparatus for adjusting a whisker assembly and a semiconuctor wafer and hermetically sealing the two parts.
Figure 11:
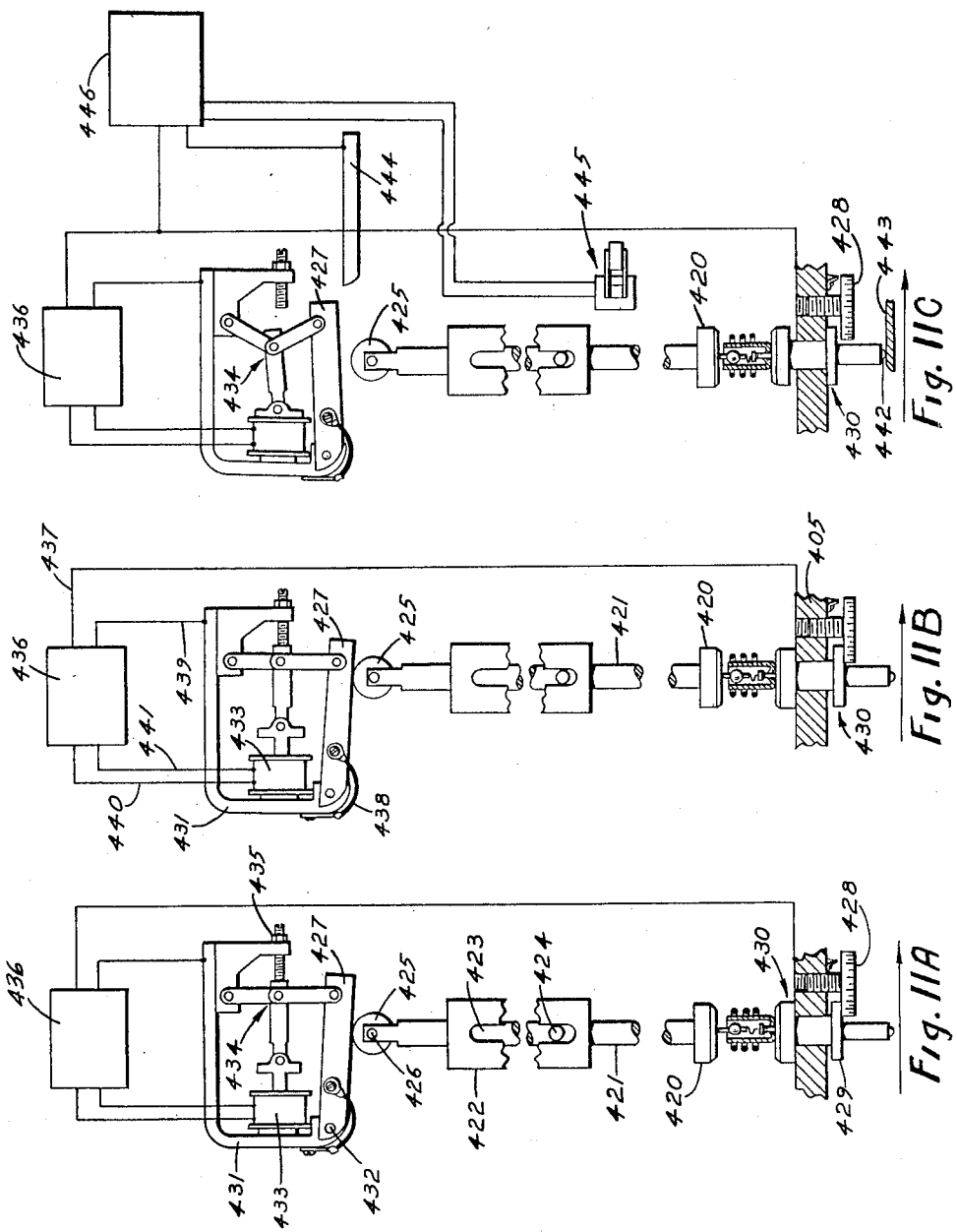
Figure 12:
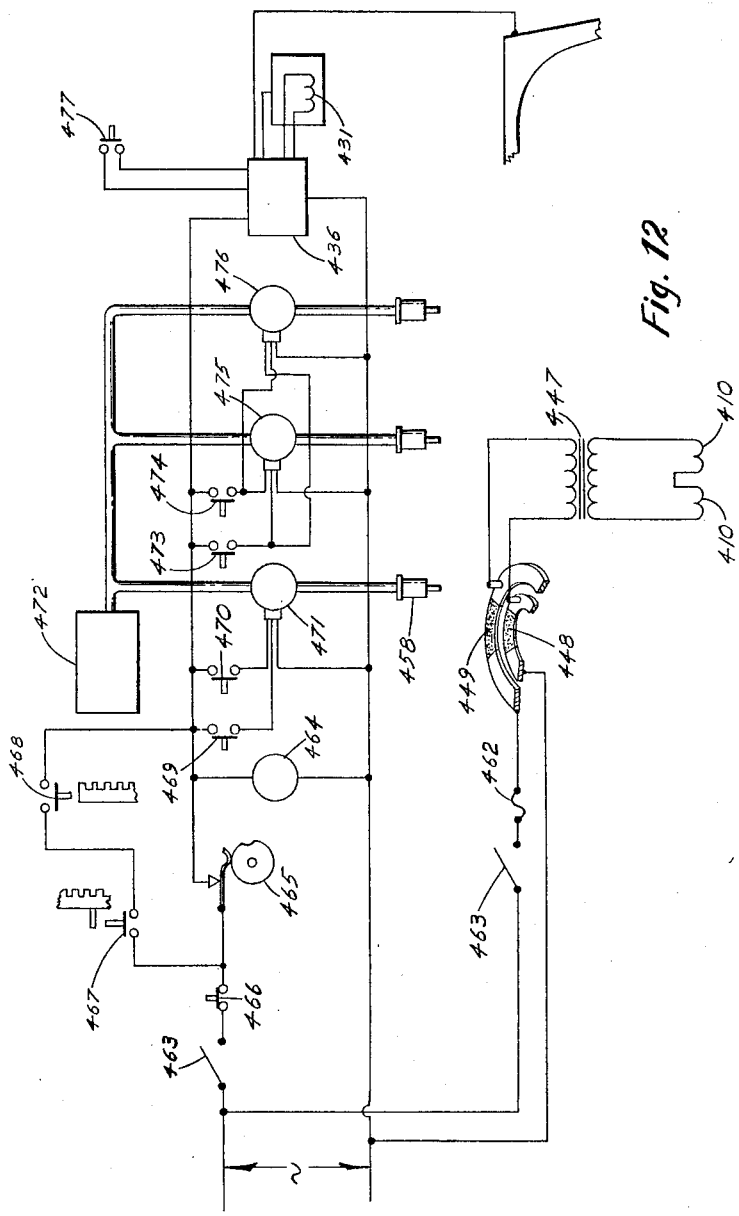

FIGS. 11A, 11B and 11C together, show the sequence of operation of the adjusting portions of the assembly apparatus shown in FIG. 10 and "pulsing" the whisker; and FIG. 12 is a schematic diagram of the control mechanism of the adjusting portions of the assembly apparatus shown in FIG. 10.

Figure 1:
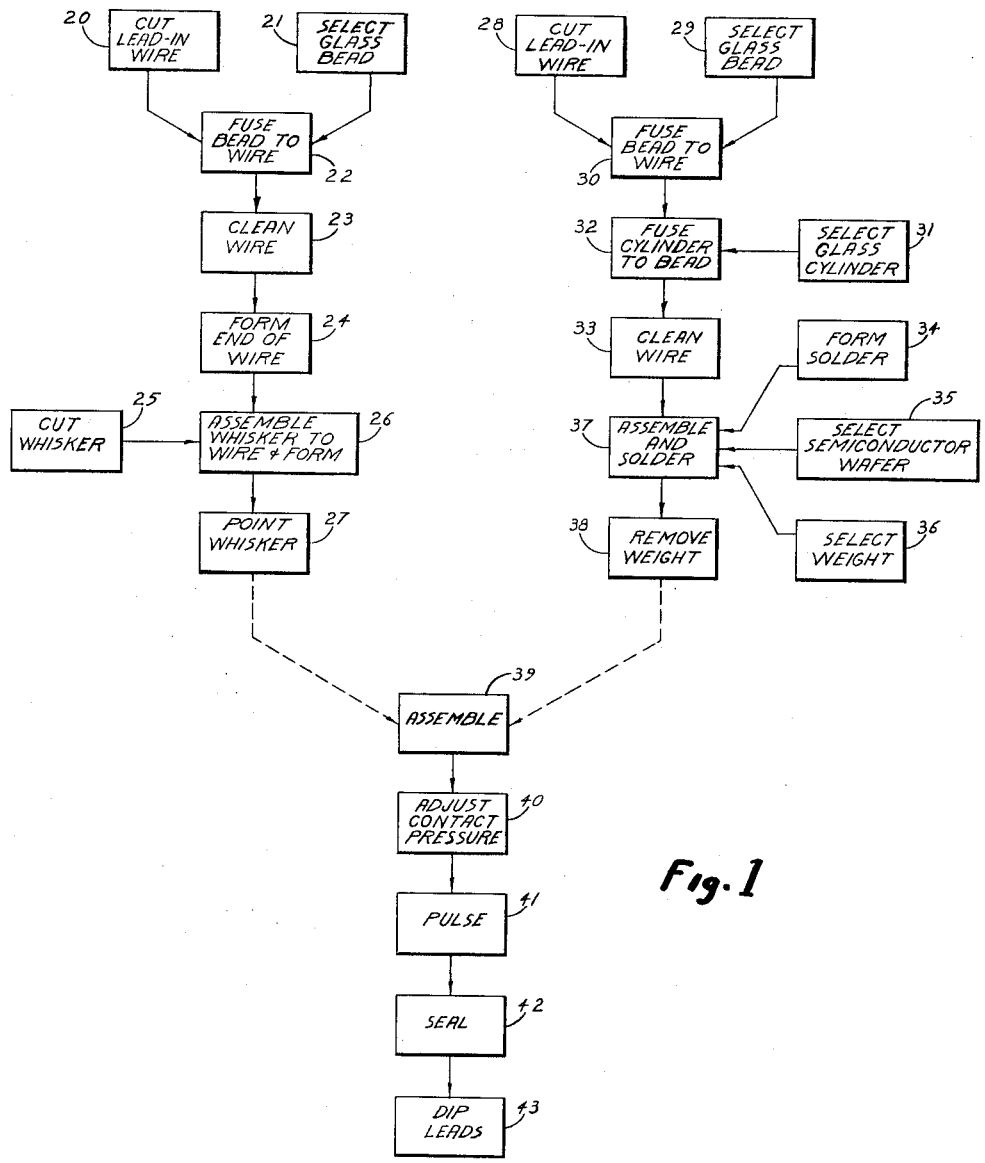
FIG. 1 is a flow chart showing the sequence of operations according to the invention.

Referring now to FIG. 1, the process contemplated by the invention is clearly shown. It should be noted that, while each of the operations indicated in FIG. 1 is preferably accomplished automatically, the transfer of components from machine to machine is not completely automatic. The dotted lines in the figure represent a manual transfer of components between machines. It should be noted further, however, that the two manual transfer operations shown could be eliminated if desired. This point will be discussed in greater detail in the specification.

Considering first the portion of FIG. 1 concerning the fabrication of the whisker assembly, a lead-in wire is cut to length by any known means, as shown at 20. A glass bead is selected, as shown at 21. The two parts are then fused together, as shown at 22. It has been found advantageous to clean the wire as at 23 in order that any oxides formed on the surface of the lead-in wire be removed to facilitate further operations. The end of the lead-in wire is then formed, as by swaging at 24, so as to prepare the lead-in wire for a whisker which has been cut, as at 25. The cut whisker is then attached to the formed end of the lead-in wire and bent into an S-shape at 26. The assembly of lead-in wire, glass bead and whisker is then transferred into an etching solution at 27, wherein the end of the whisker is pointed.

Turning now to the portion of FIG. 1 concerning the assembly of a semiconductor wafer to a lead-in wire, a lead-in wire is cut, as at 28; a glass bead is selected, as at 29; and the two parts are fused together, as at 30. A glass cylinder of appropriate size is selected, as at 31, and then fused to the glass bead, as at 32. The lead-in wire is then cleaned, as at 33, to prepare it for further operations. After the wire has been cleaned, the wire, glass bead and glass cylinder assembly is moved so that a shaped piece of solder, formed as at 34, a semiconductor wafer, chosen as at 35, and a weight, selected as at 36, may be placed consecutively within the cylinder, as at 37. The semiconductor wafer is then soldered to the inner end of the lead-in wire and the weight is removed, as at 38.

A whisker assembly and semiconductor wafer assembly are then placed together, as at 39, so that the pointed end of the whisker is spaced a short distance from the surface of the semiconductor wafer and the glass bead on the whisker assembly is just inside the glass cylinder in the semiconductor wafer assembly. The pressure of the whisker on the semi-conductor wafer is then adjusted, as at 40. While this adjustment may be accomplished in a number of ways, it is preferred that the particular adjusting device illustrated and described in detail later in this specification be used in order that the same pressure between whisker and wafer be applied regardless of the dimensional tolerances involved. After the correct pressure between the whisker and wafer has been set, the whisker is then pulsed, as at 41, to make a rectifying junction and the final seal between the glass bead on the whisker assembly and the glass cylinder may be made, as at 42, by heating the two parts inductively by known means. The semiconductor device is then hermetically sealed. The leads may then be dipped in solder, as at 43, to facilitate connection of the device in an electrical circuit of any desired type.

Figure 2:
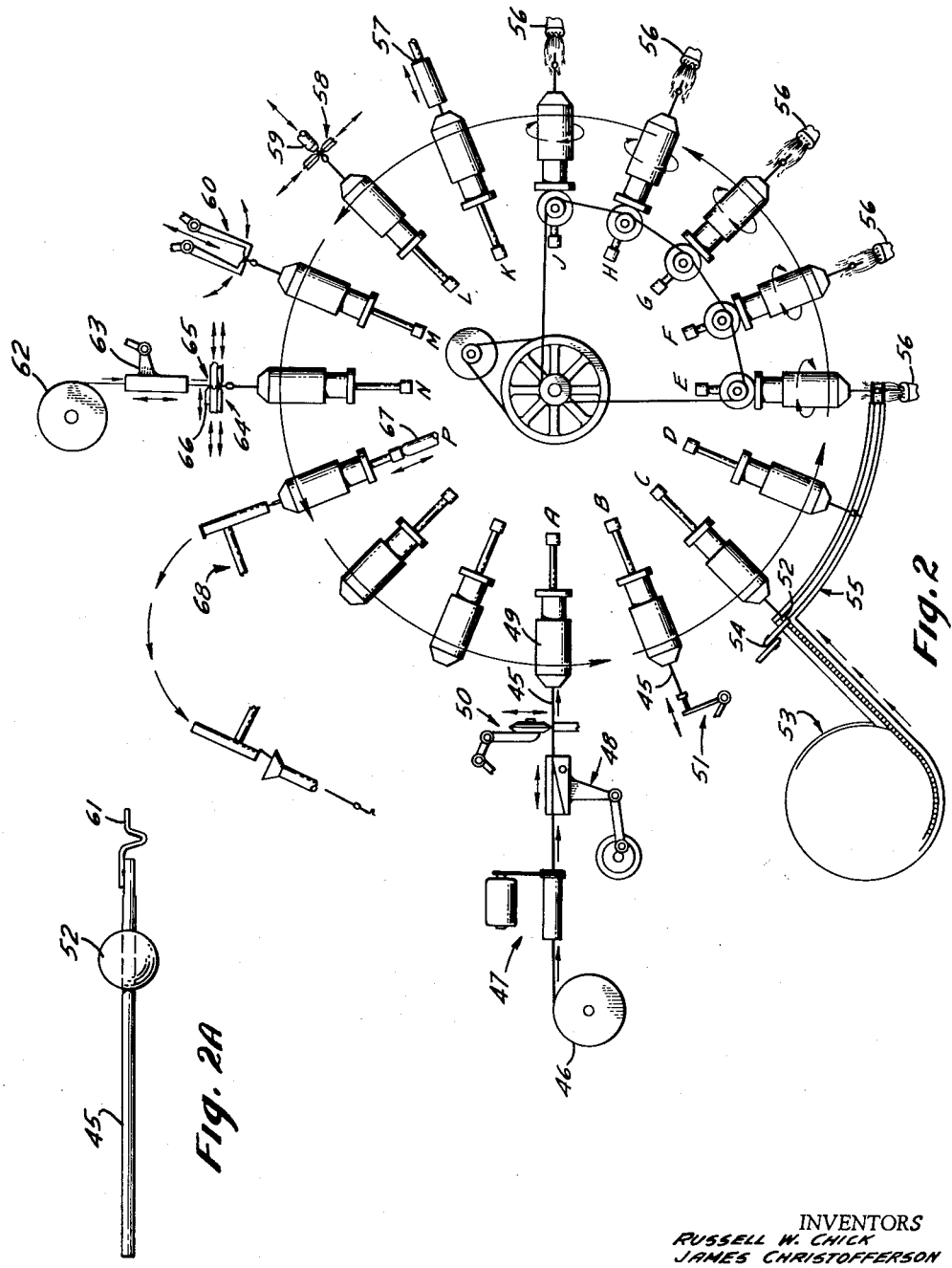
FIG. 2 is a partially schematic plan view of machinery for assembling and forming a whisker assembly.

Referring now to FIG. 2, apparatus for producing the said assembly shown in FIG. 2A is illustrated. As may be seen, the apparatus in FIG. 2 is a multi-head indexing machine in which operations are performed in sequence. Since, in a preferred embodiment, the timing of the apparatus may be performed by known timing mechanisms, such as Geneva drives and appropriately shaped cams, only the operative stations of the apparatus are shown. The stations are lettered alphabetically, starting with "A" and ending with "P," exclusive of "I" and "O."

The lead-in wire 45 is first cut to length at Station A as follows. Wire is fed from a spool 46 through a wire straightener 47 by means of a feeding device 48. After an appropriate length of the wire has been fed into the chuck 49, a wire cutter 50 is actuated to cut off a lead-in wire 45. The apparatus then indexes to Station B, where the length of wire projecting outwardly from the chuck is adjusted by means of a cam-operated plunger assembly 51. The apparatus then indexes to Station C, where a glass bead 52 is slipped over the lead-in wire 45. The particular glass bead 52 used is selected from a conglomerate mass of similar beads by means of a known shake table 53 and an associated movable stop 54. The apparatus then indexes to Station D, moving the glass bead between two tracks 55, thereby adjusting the position of the glass bead 52 on the lead-in wire 45. The apparatus then indexes consecutively to Stations E, F, G, H and J, at each of which stations heat is applied to the bead 52 and the lead-in wire 45 to fuse the two together. This fusing may be accomplished by the flame from gas jets 56 and by rotating the chuck at each of the foregoing stations through a friction drive as illustrated. After the two parts have been fused together, the apparatus indexes to Station K where the lead-in wire 45 is cleaned by subjecting it to heat in a reducing atmosphere as from a hydrogen burner 57. This operation is necessary in order to remove the oxides that form on the lead-in wire during the fusing operation. After the wire has been cleaned at Station K, the apparatus indexes to Station L where the free end of the lead-in wire 45 is trimmed by means of cutters 58 after the length of the lead-in wire 45 and bead 52 projecting out of the chuck have been properly adjusted by punger 59. After the lead-in wire 45 has been trimmed at Station L, the apparatus indexes to Station M, where the outer end of the lead-in wire 45 is flattened, as by scrapers 60, so that at least one flat surface is produced to receive a whisker 61. The apparatus then indexes to Station N, where a whisker 61 is attached to the flattened portion of the lead-in wire 45. It has been found advantageous to first feed suitable wire from feed spool 62 by means of a wire feeding device 63. After an appropriate length of this wire has been fed by wire feeding device 63, the free end of the wire is then attached to the flat portion of the lead-in wire 45, as by welding with electrodes 64. Forming tools 65 are then actuated to put an S-shaped bend in the whisker wire adjacent the lead-in wire 45. Before the forming tools 65 are retracted, a cutter 66 is actuated to cut off the whisker wire. At this point, the whisker assembly is exactly the same as that shown in FIG. 2A. It is necessary to remove this assembly from the apparatus, so the apparatus indexes to Station P, where ejector 67 operates on the chuck 49 to push the whisker-bead assembly into a transfer mechanism 68. This transfer mechanism is then operated to move the completed whisker-bead assembly to the pointing machine shown in detail in FIG. 3.

Figure 3:
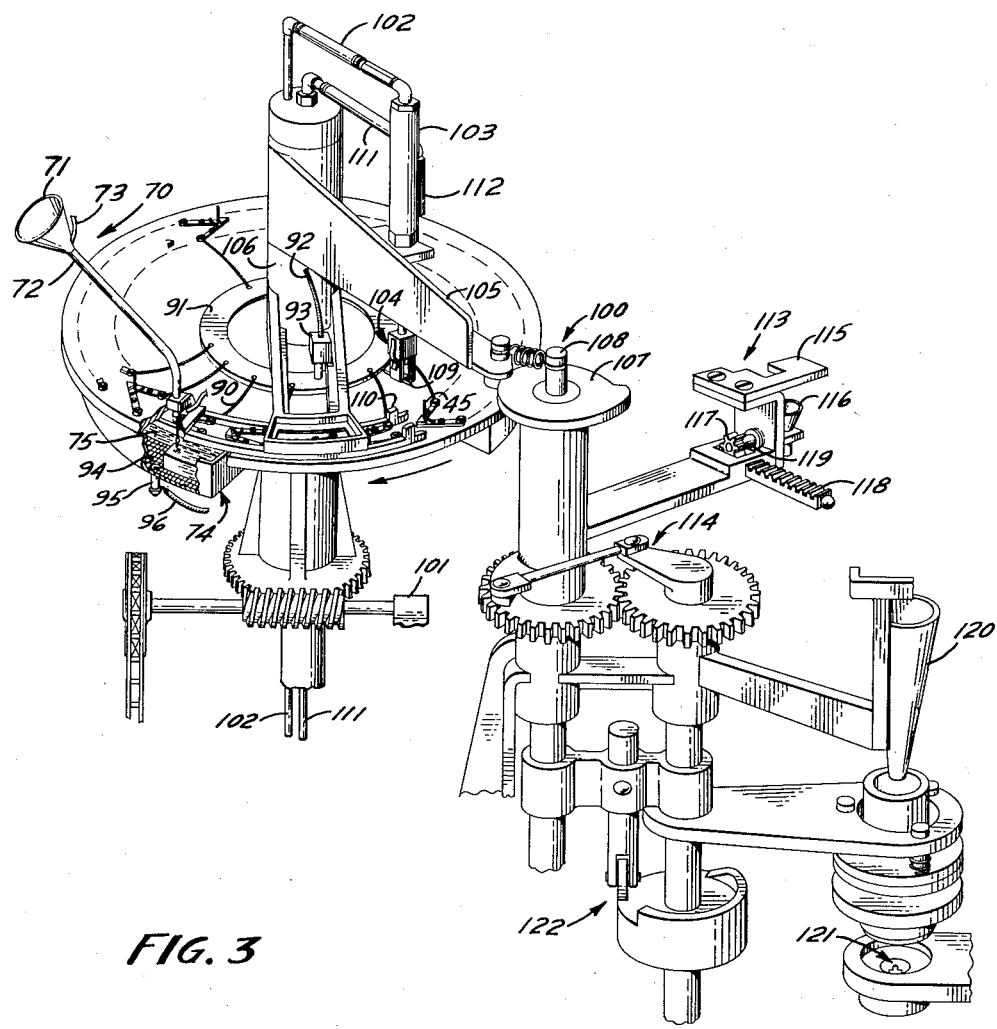
FIG. 3 is a perspective view of apparatus for pointing the end of the whisker assemblies.

Referring now to FIG. 3, a pointing machine that produces whisker-bead assemblies as shown in FIG. 6A, starting with the whisker-bead assembly of FIG. 2A, is shown in detail. As noted previously, a whisker-bead assembly to be pointed is transferred from Station P of the apparatus of FIG. 2 through transfer mechanism 68 and dropped into the pointing machine loading device 70. In a preferred embodiment, the loading device 70 consists merely of a funnel 71 having an elongated tube 72 leading from its apex to the loading station of the pointing machine. An air line 73 may be attached to the funnel adjacent the elongated tube 72 so that the whisker-bead assemblies being loaded on the pointing machine may be blown down through the tube, thus preventing jamming.

The pointing machine itself consists generally of a pointing section 74 and a cleaning section. Each whisker-bead assembly is loaded onto the pointing machine with the whisker projecting downwardly into a solution 75 in the pointing section 74, held in place by a clamp shown in more detail in FIGS. 4, 5 and 6. Each whisker assembly moves through the pointing section until the end is rounded, as will be described, then moved through the cleaning section which is filled with pure water, and then automatically unloaded from the machine.

As may be seen more clearly in FIGS. 4 and 5, the whisker assembly drops out of the elongated tube 72 into a conical opening 76 so that the free end of the whisker rests on the top of a flat plate 77. The top of the plate is slightly below the top of a pan 78 which holds the solution 75. Pan 78 is filled to overflowing with the solution 75. In this manner, the length of the whisker 61 in the solution 75 is fixed. A jet of air is blown against the lead wire 45 of the whisker assembly through a nozzle 79. This jet forces the lead assembly into position so that the clamp assembly 80 may grasp the assembly and hold the assembly in a predetermined position. The clamp assembly 80 consists of a pair of spring-loaded arms 81, 82, each of which is pivoted on a pivot pin 83. Rollers 84 are fixed to the ends of each of the spring-loaded arms. The upper roller, as shown in FIG. 4, cooperates with cam 85 and the lower roller 84 cooperates with cam 86. In operation, the upper roller 84 moves along cam 85, holding arm 81 in a retracted position until roller 84 moves into the cut-away portion of cam 85. At this time, spring 87 operates to pull the arm 81 down until it comes in contact with a pin 88. After arm 81 hits pin 88, that arm is in position to hold the lead-in wire 45. Shortly after upper roller 84 moves into the cut-away portion of cam 85, the lower roller 84 moves off the cam 86. The arm 81 being then pressed against the pin 88, it serves as a base for the spring 87 to pull the arm 82 toward the lead-in wire. As the arm 82 moves toward the lead-in wire 45, pivoting about pivot pin 83, the inner surface of a triangular cap 89 affixed to the end of arm 82 presses against the lead-in wire 45. This pressing forces the lead-in wire 45 into a vertical position against the pressure of air jet from nozzle 79. When arm 82 reaches the end of its downward travel, the lead-in wire 45 is essentially perpendicular to the surface of the solution in the pointing section and is held firmly there. The arm 81 also serves as an electrical connection to the lead-in wire 45 and thence to the whisker 61. A lead wire 90 connects arm 81 to a commutator 91, which in turn is connected through leads 92 and terminal box 93 to an external source of electrical energy. An electrically conducting grid 94 is laid on the bottom pan 78. Grid 94 is connected through conductor 95 and lead wire 96 to the other side of the source of electrical energy previously mentioned. As a result, an electrical circuit is completed through the solution 75 and the whisker 61. While many solutions could be used, an etching solution of potassium hydroxide, cupric fluoride, glycerine and demineralized water has been found satisfactory. The whisker 61 is immersed a predetermined distance in the solution, the assembly is moved through the solution until the desired sharp point has been formed on the end of the whisker. While it would seem that extreme care must be taken to prevent agitation of the solution 75 to avoid uneven etching, it has been found that, if the pan 78 is filled to overflowing, the solution 75 cannot be agitated enough to affect the quality of the point etched on the whisker 61. When the assembly is moved to the end of the pan 78, all the portion which was originally in the solution has been eaten away and the end of the whisker is substantially even with the surface of the solution 75. It has been found, however, that the end of the whisker 61 is slightly above the surface of the solution. A meniscus about the whisker causes etching to continue after the whisker is out of the main body of the solution. This phenomenon permits the whisker 61 to be removed from the solution 75 without lifting since it clears the top of pan 78. As insurance against the end of the whisker hitting against the back wall of the pan 78, a small notch (not shown) may be cut in that wall without affecting the height of the solution 75 in the pan 78 to any appreciable degree. After the whisker assembly leaves the pointing section 74, it is moved directly into a cleaning section. The cleaning section consists essentially of a pan (not numbered) which is similar in shape to the pan 78. However, no electric potential is placed across the cleaning section as was the case in the pointing section 74. The pan in the cleaning section may be filled with pure water which effectively removes all traces of the solution which may adhere to the whisker 61 as the result of its immersion in the solution 75. After the assembly has been in the cleaning section for a sufficient length of time, it moves into an unloading assembly 100. The function of the unloading assembly 100 is to release the spring-loaded arms 81, 82, remove the processed whisker-lead-in assemblies and transfer and orient the same for future operations. Releasing of the arms 81, 82 is accomplished in the same manner as that employed in causing them to grasp the lead-in wire 45, except that the process is carried on in reverse. As shown in FIG. 4, the rollers 84 are forced inwardly by the cams 85, 86. This causes both arms to pivot about their respective pivot pins 83, against the tension of the spring 87. Immediately after the arms 81, 82 are released, a cam-operated solenoid valve 101, shown in outline on the main drive shaft of the unit, is actuated so as to pass air through line 102 and adjusting valve 103 to force the pick-off assembly 104 downwardly over the lead-in wire 45. Since the lead-in wire 45 is moving, as shown by the arrow adjacent thereto, it is necessary that the pick-off assembly 104 likewise move. This object is accomplished by mounting the pick-off assembly 104 on an arm 105 which is pivoted on the main supporting standard 106. The movement of the arm 105 is accomplished by a cam 107 connected to shaft 108 and thence to the main drive unit (not shown). When the pick-off assembly approaches the bottom of its travel, as shown in FIG. 6, but before it reaches the top of the lead-in wire 45, pins 109 meet the upwardly projecting ears 110 on the cams 85, 86. This causes the spring-loaded jaw of pick-off assembly 104 to open leaving space for the lead-in wire 45 to enter the assembly. As soon as the pins 109 pass beyond the ears 110, the spring-loaded jaw closes, grasping the lead-in wire 45 firmly within the pick-off assembly 104. Solenoid valve 101 is again actuated, again by a cam (not shown), so that air is passed through line 111 and regulator 112 to force the entire pick-off assembly upwardly. This movement removes the lead assembly from position between arms 81, 82. Immediately thereafter, transfer mechanism 113 is actuated by gear assembly 114, so that the plate 115 is moved into contact with the pins 109. This movement then forces the spring-loaded jaws of pick-off assembly 104 to release their hold on the lead-in wire 45, causing the whisker-lead-in assembly to drop into cup 116. When the transfer mechanism 113 moves away from the pick-off assembly 104, pinion 117 moves along rack 118. The movement of pinion 117 is transmitted through shaft 119 to tip cup 116 thereby causing the whisker-lead-in assembly to fall into funnel 120 and thence into chuck 121. Chuck 121 is then opened as shown by cam and cam follower assembly 122. It is noted, moreover, that chuck 121 grasps the lead-in wire 45 of the whisker-lead-in assembly. In connection with chuck 121, it has been found advantageous to have the outside of the chuck appropriately shaped so that the chuck may be inserted in the final assembly apparatus to be described hereinafter.

FIG. 7 shows the general layout of presently preferred apparatus for placing a predetermined amount of solder on the lead-in.

FIG. 7 shows the general layout of presently preferred apparatus for soldering a semiconductor wafer to a lead-in wire. A lead-in wire and glass cylinder assembly 200 is fed into a chuck on an endless belt conveyor as at 201. The assembly 200 is then moved through an oven 202 in which a reducing atmosphere is maintained. When the assembly 200 moves out of the oven 202, any oxides on the surface of the lead-in wire has been removed and the assembly 200 is ready for soldering. The assembly 200 is then moved through a solder dispenser 203, the operation of which will be described in detail in connection with FIG. 8, where a formed wafer of solder 257 is placed on the end of the lead-in wire as shown in FIG. 7A. The assembly 200 is then moved through a semiconductor wafer dispenser 204, the operation of which is described in detail in connection with FIG. 9, at which time a semiconductor wafer is placed on top of the solder 257, as is shown in FIG. 7B. The assembly 200 is then moved through a weight dispenser 205. Since, in the presently preferred embodiment, the weight dispenser 205 is an adaptation of known machinery, it will be shown only in outline. The assembly 200 is as is shown in detail in FIG. 7C. The assembly 200 is then moved through an oven 206. During passage of the assembly through the oven, the solder 257 is melted to join the semiconductor wafer to the lead-in wire. It will be noted here that the weight serves only to hold the various parts in the assembly 200 in their correct positions when the solder 257 is melted. After the assembly has been moved through the oven 206, the weight is removed and returned to the weight dispenser 205. Again, the device 207 used to accomplish this end is known so it will not be shown in detail. The completed assembly 200 is then removed from the conveyor and is ready for insertion in the apparatus described in FIG. 10.

Figure 8:
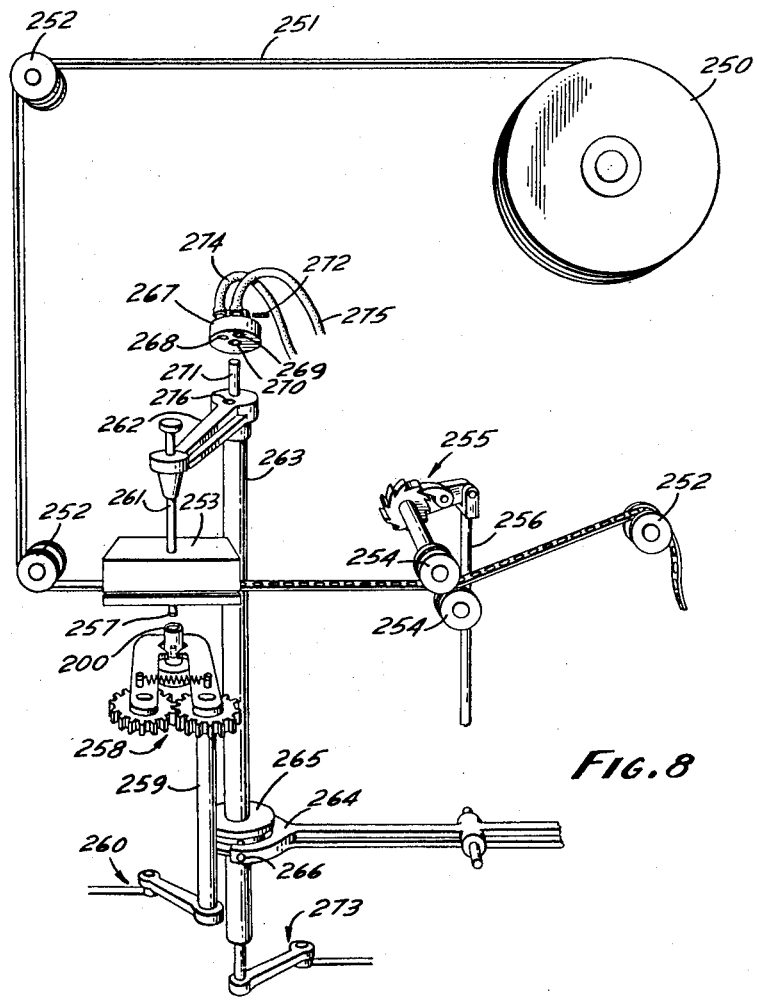
FIG. 8 is a perspective view, partially broken away, of a solder-dispensing device as shown in outline in FIG. 7.

In the solder dispenser illustrated in FIG. 8, a feed spool 250 is loaded with solder in the form of a strip 251. The strip 251 is led off the spool 250 over idler wheels through a block 253 and then through sprocket wheels 254. At least one of the sprocket wheels 254 is driven by a shaft through a ratchet and pawl assembly 255. Ratchet and pawl assembly 255 is actuated, in turn, by a shaft 256, which is moved by a cam (not shown) each time the pawl in the ratchet and pawl assembly 255 is indexed one notch in the ratchet. The solder strip 251 is moved a sufficient distance for a piece thereof to be punched out, as will be described hereinafter. Each time the solder strip 251 is moved, an assembly, such as the one shown in FIG. 7A, is positioned to receive a formed piece of the solder. It should be noted in this connection that, in the preferred embodiment, each such assembly is moved along a conveyor belt. For simplicity, however, the conveyor belt has been omitted from FIG. 8. As shown in FIG. 8, the solder, as it is being applied to the sub-assembly, is in the form of a disc 257. It has been found desirable, moreover, to ensure a correct orientation of the sub-assembly which is to receive the disc 257. This orientation is attained by grasping the outside of the sub-assembly between two movable jaws, as illustrated. Opening and closing of the jaws is accomplished by rotation of a pair of spur gears 258, as shown. At least one of the spur gears 258 is connected to a shaft 259 which, in turn, is oscillated back and forth by a crank system 260. The crank system 260, in turn, is actuated by a cam (not shown). After the subassembly has been positioned, a hollow punch 261 is moved downwardly through an appropriately shaped opening in the block 253, thereby punching out a section of the solder strip therein. Movement of the punch is effected by mounting the punch 261 on an arm 262 which is rigidly attached to a hollow vertical shaft 263. A pair of closely spaced collars 265 are attached to the shaft 263 adjacent its lower end. A forked arm 264, having a pair of inwardly projecting pins 266 attached thereto, is disposed adjacent the two collars 265 so that the pins 266 extend into the space between the two collars 265. When the forked arm 264 is rotated up and down, as by a cam (not shown), the collars 265, the hollow shaft 263, the forked arm 262, and the punch 261 are moved up and down. In addition to the foregoing, a top cap 267 and the parts associated therewith also move up and down. The top cap 267 has formed therethrough, three openings 268, 269, 270. Opening 270 is shaped so as to receive a shaft 271. Shaft 271 is mounted coaxially with hollow shaft 263 and is rigidly attached to the top cap 267, as by a setscrew 272. The lower end of the shaft 271 is slidably connected to a crank system 273. Crank system 273, in turn, is actuated periodically as by a cam (not shown). The purpose of the foregoing connection is to permit shaft 271 and the top cap 267 to be lifted periodically along with the shaft 263 and, at the same time, allowing the shaft 271 and the top cap 267 to be rotated independently of the shaft 263. The first opening 268 in the top cap 267 is connected through a flexible hose 274 to a vacuum pump (not shown). The second opening 269 is connected through a flexible hose 275 to a pressure tank (not shown). The arm 262 has a longitudinal passage connected at one end with the inside of the hollow punch 261 and, at the other end, with opening 276. The driving cams for the various shafts are so synchronized that, when the punch 261 is moving downwardly to punch out disc 257 and place the disc in its desired position in the subassembly, openings 268 and 276 are coincident with each other. The vacuum pump is then connected through hose 274 to the passage in arm 262 to the inside of the punch 261, thereby holding the disc 257 on the end of the punch. When the punch has reached the lowest end of its travel downward, shaft 271 is rotated so as to move opening 268 away from opening 274, thereby disconnecting the vacuum pump and to bring opening 268 in coincidence with opening 276. Such a movement then connects the pressure through hose 275, the passage in arm 262 and the inside of the punch 261. This breaks the seal between the end of punch 261 and the disc, forcing the disc off the end of the punch and places it in its proper position in the sub-assembly. In this connection, it should be noted that it has been found desirable to have the inside diameter of the hollow punch 261 slightly larger than the diameter of the wire projecting inside the sub-assembly and to adjust the downward travel of the punch 261 so that the lower end of the punch travels just below the end of the wire. As a result, the disc 257 is formed around the end of the wire.

Figure 9:
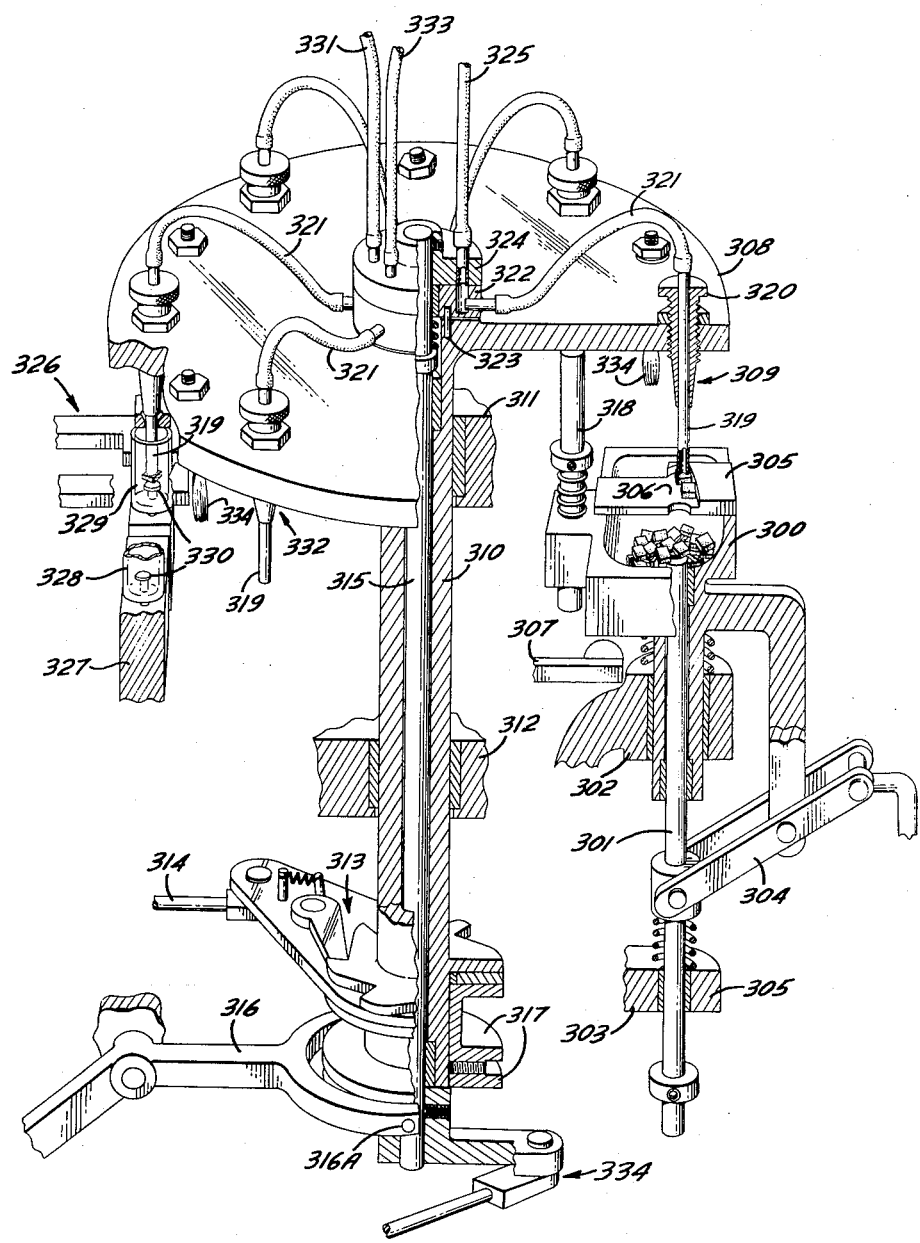
FIG. 9 is a perspective view, partially broken away, of a semiconductor wafer selecting and dispensing device as shown in outline in FIG. 7.

FIG. 9 shows a presently preferred embodiment of a device for selecting a single semiconductor wafer from a group of wafers. The wafers are placed in a holder 300 having an opening formed therethrough to accommodate a shaft 301. Shaft 301 is supported in a vertical position by bearings 302, 303 and has a lifter 304 attached thereto. Lifter 304 is actuated periodically by a cam (not shown). The cam causes the shaft 301 to be raised periodically, moving through the mass of semiconductor wafers within the holder 300, thereby raising at least one of the wafers to the level of a plate 305 which is secured across the top of the holder 300. Plate 305, preferably, has an indentation 306 formed on its top surface, the indentation being of such shape and size that only one semiconductor wafer may be placed in it. A vibrator 307 has been found to be advantageous in that, when such a device is operated in conjunction with the holder 300, the semiconductor wafers contained therein are more easily selected. The vibrator prevents packing of the wafers. An indexing table 308 is disposed above holder 300 in such a manner that each one of a plurality of transfer stations 309 may be positioned above the indentation 306. A typical one of the transfer stations 309 will be described in more detail hereinafter. The indexing table 308 is supported on a hollow vertical shaft 310 in bearings 311 and 312. Indexing of the table is accomplished through a ratchet and pawl assembly 313, which is actuated by a cam (not shown) attached to shaft 314. Shaft 315 is disposed within the hollow vertical shaft 310. A forked arm 316 is held between a pair of collars 317 by means of pins 316A (only one of which is shown). Forked arm 316 is periodically actuated by a cam (not shown) so as to move hollow vertical shaft 310 up and down against the force of a spring-loaded stop 318 which is mounted on holder 300. The downward movement of the shaft 310 in turn results in up and down movement of the transfer station 309. As illustrated, downward movement has just been accomplished so that the transfer station adjacent the holder 300 has just operated so as to pick up a semiconductor wafer.

Each transfer station 309 consists of a small tube 319 mounted in an adjustable bushing 320. The upper end of tube 319 is connected through a resilient hose 321 to a block 322. Block 322 is pinned to indexing table 308 as by pin 323. A second block 324 is disposed in contact with block 322, as shown. Block 324 is attached to shaft 315. Appropriately shaped openings are made in the block 322 and 324 so as to form two manifolds. One of these manifolds is connected through a tube 325 to a vacuum pump (not shown). When the tube 319 is brought in contact with the semiconductor in the indentation 306, the vacuum pump is connected to the tube 319, thereby picking up the wafer. Simultaneously with the picking up of a semiconductor wafer by tube 319, a previously-picked up wafer is unloaded at unloading station 326. The unloading station 326 consists of a conveyor 327, carrying sub-assemblies 328, 329, at spaced intervals, as shown. Sub-assembly 329 is the sub-assembly having a semiconductor inserted therein, while sub-assembly 328 will be moved into the position of sub-assembly 329 and receive the next semiconductor wafer, after the one being inserted in sub-assembly 329. The semiconductor wafer being inserted in sub-assembly 329 is brought down close to the surface of a formed piece of solder 330, as shown, when the table 308 is moved downwardly by means of forked arm 316. At this time, tube 319 in the unloading station 326 is connected through its tube 321 to the second manifold within the blocks 322, 324. This second manifold is connected by a hose 331 to a source of low pressure air. The vacuum seal between the end of the tube 319 and the wafer thereby being broken. The wafer falls off the end of the tube 319 and on to the solder 330. The table is then raised and indexed to cleaning position 332. At this position, tube 319 is connected through its hose 321 to a source of high pressure air (not shown). This connection of the tube 319 to hose 321 is made by rotating block 324 until an opening (not shown) formed therein and connected with hose 333 becomes coincident with an opening in the block 322 connecting with tube 321. Rotation is effected by crank assembly 334 being rotated by a cam (not shown) so as to rotate block 324 through shaft 315. This high pressure air ensures cleaning of the end of the tube 319 in the event that it becomes clogged by dust or for any other reason. A plurality of brushes 335, one of which is disposed in front of each of the tubes 319, is also used for cleaning. As the machine indexes to place successive ones of the tubes 319 in position over the indentation 306, the brush, associated with each of the tubes, wipes across the plate 305, removing any semiconductor wafers which may be there, except the one in the indentation 306. Any wafers which are removed by the wiping action of the brush 334 are dropped back into the holder 300.

FIGS. 10 through 13 show apparatus for assembling the sub-assembly shown in FIG. 6A and the sub-assembly shown in FIG. 7A to form a completed device. It should be noted, before discussion of FIG. 10, that details such as mounting structures, connecting wires, and power supplies have been eliminated in order to clarify the drawing. Furthermore, only four stations have been shown in any detail, it being assumed that any person having skill in the art would be able to add any desired number of stations to the illustrated apparatus.

The apparatus shown in FIG. 10 performs the following operations sequentially and automatically:

(1) Adjusts the pressure between the whisker of sub-assembly 6A and the semiconductor wafer of sub-assembly 7A, preferably by mechanism, such as that shown at 11;

(2) "Pulses" the adjusted device to form an electrically rectifying contact between the end of the whisker and the semi-conductor wafer;

(3) Fuses the glass bead of sub-assembly 6A and the glass cylinder of sub-assembly 7A to complete sealing of the semiconductor device;

(4) Ejects each completed device for marking and final test.

The illustrated apparatus consists basically of an upper table assembly 400, a lower table assembly 401, a drive unit assembly 402 and an adjusting unit 11. The two table assemblies are mounted on a base 403 and are driven through a worm and spur gear assembly 404 as shown, the main casting 405, from which the lower table assembly is formed, being attached to the worm gear 406 as by bolts 407 (only one of which is shown) and the casting 408 from which the main support of the upper table assembly 400 is formed being attached to the upper surface of the main casting 405, as by welding. Thus, it may be seen, therefore, that when the main drive motor (in illustrated case, an electric motor) is energized, the worm and gear assembly 404 is actuated through the illustrated system of gears and belts to move the upper table assembly 400 in synchronism with the lower table assembly 401. The lower table assembly 401 supports any desired number of chucks 409, each of which is inserted in an appropriately shaped opening in the lower table assembly 401 at the station marked "A." It will be noted that just before insertion of a chuck 409 at Station A, a heater assembly 410, which is intended to cooperate with the chuck 409 and to make the final seal between the sub-assemblies of the device is retracted. Retraction is accomplished by means of a spring-loaded plunger assembly 411 projecting through an opening in the lower table assembly 401 and operating on the lower surface of the support for the heater assembly 410. As may be noted at Station A, the support for the heater assembly 410 is pivotally mounted adjacent the top surface of the main casting 405. As soon as the plunger assembly 411 is moved past the end of a stationary track 412, supported as by a formed member 413 to stationary base 403, the plunger is retracted and the heater assembly 410 rotates by its own weight so that the heater assembly surrounds the semiconductor assembly 7A in the chuck 409, as shown at Station B. Simultaneously with the operation just described, a whisker assembly is placed in a chuck supported by the upper table assembly at Station A. At Station C, the chuck supporting the wisker assembly is moved downwardly so that the end of the whisker wire stops just above the upper surface of the semiconductor wafer in the sub-assembly held by chuck 409. As illustrated, this movement may be accomplished by connecting the main drive unit through a bevelled gear assembly 413, a shaft 414, a cam assembly 415, a rack and pinion gear assembly 417, a shaft 418 and a second rack and pinion gear assembly 419.

The assembly is then moved to Station D, at which station the pressure between the semiconductor wafer and the whisker is adjusted. The exact sequence in which adjustment is accomplished may be seen more clearly in FIGS. 11A, 11B and 11C.

Referring now to FIGS. 10 and 11A, it may be seen that the upper chuck 420 is slidably supported by a shaft 421 in an elongated bearing box 422. A friction device 222a which is located in the inner wall of the bearing box 222 consists of a push rod securely held against the shaft by a spring such that the shaft 221 maintains any set vertical position. The bearing box has a slot 423 formed longitudinally therein to receive a pin 424 attached to the shaft 421 and extending outwardly from the outer surface of the bearing box 422. The formed end of the rack in the pinion and rack assembly 419 cooperates with this pinion to drive the chuck 420 and the whisker attached thereto downward until the end of the whisker is just above the upper surface of the semiconductor wafer, as previously mentioned. The upper end of the shaft 421 is slotted so as to receive a wheel 425, the wheel being held in place by a pin 426. The wheel is brought into contact with an inclined member 427 so that, as the upper and lower table assemblies move in the direction indicated by the arrows, the end of the whisker is brought into contact with the semiconductor wafer, as shown in FIG. 11B. It should be noted that the clearance between the end of the whisker and the semi-conductor wafer, at the position shown in FIG. 11A, is adjusted by means of a micrometer 428 operating on a flange 429, fixedly attached to the lower chuck assembly 420. Inclined member 427 is supported on a base 431 by means of a pin 432. The base 431 is electrically insulated from the frame of the machine. Base 431 also supports a solenoid 433. The plunger of the solenoid 433 is connected through the linkage assembly 434, as shown, to the free end of the inclined member 427. An adjusting screw 435 is also supported by base 431 and serves to limit the travel of the solenoid plunger and linkage 434. When the upper and lower table assemblies move, the roller 425 continues moving along the surface of inclined member 427 until the end of the whisker is forced into contact with the upper surface of the semi-conductor wafer, as shown in FIG. 11B. At this time, an electrical circuit is completed to actuate a control device 436. This circuit is as follows: through wire 437 to casting 405; through lower chuck assembly 430; through the semiconductor wafer and whisker; through upper chuck 420; shaft 421; roller 425; inclined member 427; a jumper wire 438; base 431 and wire 439. As soon as the circuit is completed, control device 436 is actuated so as to energize solenoid 433 through wires 440 and 441. It should be noted that the circuit contained in control device 436 may take any one of many known forms. A presently preferred circuit is the well-known thyratron trigger circuit. As soon as the solenoid 433 is energized, its plunger is retracted and the inclined member 427 is forced into the position shown in FIG. 11C by action of the linkage 434. This action stops any further downward movement of the upper chuck 420 holding the whisker, the chuck 420 being held in position by the engagement of the friction device 222a with the shaft 421.

At this time, ball bearing 442, disposed at the lower end of lower chuck assembly 430, rides up over platform 443 to move the lower chuck assembly with the semiconductor wafer attached thereto upwardly toward upper chuck 420 and the whisker. By proper adjustment of the micrometer 428, the upward throw of the lower chuck 430 may be adjusted so that it is in the order of 2 mils. Such movement of the lower chuck places the proper pressure between the whisker and the semiconductor wafer, since the weight of the upper chuck assembly, the friction device 222a and the resiliency of the whisker combine to prevent any movement of the upper chuck and the whisker. After the proper pressure has been applied between the whisker and the semiconductor wafer, the upper and lower chuck may move again in the direction of the arrow, so that the roller 425 comes in contact with member 444, after having moved out from under inclined member 427. As may be seen, this contact with member 444 completes an electrical circuit through the roller and upper chuck down through the whisker to the semiconductor wafer. After having made contact with member 444, the upper chuck assembly then contacts the actuator on switch 445. When switch 445 is actuated, current from power supply 446 is then passed through member 444, and the upper chuck assembly to the whisker and semiconductor wafer. Power supply 446 may take any one of many known forms, its purpose being to pass a relatively large pulse of current, say in the order of 2 amperes, through the whisker and semiconductor wafer, thereby welding the whisker to the wafer and forming a rectifying junction at the point of contact of the whisker to the semiconductor wafer.

After the rectifying junction has been formed, the device has been essentially completed, it being necessary only to form the final seal between the glass cylinder and the glass bead on the lead-in wire going to the whisker. This seal is formed by energizing the heater element 410 after the rectifying junction between the whisker and the wafer has been made. This end is accomplished by connecting the heater element 410 through appropriate lead-wires (not shown) to the secondary windings of a transformer 447. It should be noted that only one transformer is illustrated, it being understood that there are more transformers in the complete apparatus. This primary windings of transformer 447 are connected through known types of brushes to commutators 448, 449. Commutators 448, 449 are, in turn, connected to a source of electrical power through lead-in wires (not shown). The heater element 410 is thereby energized for a sufficient length of time to fuse the bead and the cylinder. During this time, the device is being sealed and the associated support members are being moved continuously. At a given point, say the station marked "E," the brushes connected to the primary of transformer 447 leave the conducting portion of commutators 448, 449, disconnecting transformer 447 from its source of power and deenergizing the heater element 410.

After the completed device has been cooled so that it may be handled without deformation of the final seal, it enters the unloading section of the apparatus. In this section, the following operations must be performed:

(1) The lower chuck must first be loosened so that the device may be picked up;
(2) The upper chuck must be raised so that the completed device will be removed from the lower chuck and raised above the heater element 410;
(3) The upper chuck must be opened and means provided for the completed device to be transferred off the apparatus;
(4) In addition to the foregoing operations, means must be provided to reset the machine so that the next device to be finished may be removed.

The foregoing operations are accomplished in sequence by the operation of a pneumatically operated plunger 450, operating on a lever 451 to open the lower chuck. Simultaneously with the opening of the lower chuck, a pinion and rack assembly 452 is actuated through shaft 414, cam 415, rack and pinion assembly 417 and shaft 418. Rack and pinion assembly 452 is operated in a similar manner to the manner in which rack and pinion assembly 419 is operated, except that when rack and pinion assembly 419 is moving downwardly, rack and pinion assembly 452 is moving upwardly. Furthermore, the lower end of rack and pinion assembly 419 is formed differently than the lower end of rack and pinion assembly 419 so that it operates on the lower side of pin 424, rather than on the upper side of pin 424, as does the lower end of rack and pinion assembly 419. After the upper chuck has been raised, it is opened by a second pneumatically-operated plunger 454, operating on a lever 455.

Since the upper end of table assemblies 400 and 401, respectively, are continuously moving, it is necessary that the means for removing the completed devices from the apparatus must be moving at the same speed in order to avoid loss of any completed devices. This object is attained by mounting the upper chuck opening plunger 454 and lever 455 on a movable, vertical standard 456. Also mounted on the vertical standard 456, is a chute 457 and an actuating plunger 458. The vertical standard 456 is mounted on a movable base 459, as shown. When the plunger 458 is actuated, it mates with an appropriately shaped opening 460 in the lower table assembly 401. As a result of this mating, the vertical standard 456 and the parts mounted thereon move along with the lower table assembly 401. As soon as the plunger 458 is deactivated, it pulls back out of the opening 460 and a spring 461 operates to pull the vertical standard 456 back into position for picking up the next device to be unloaded.

It will be appreciated that the various operations described concerning the apparatus illustrated in FIGS. 10 and 11 must be synchronized. The electrical circuits and the enumerated lines which are required to perform this synchronization are shown in schematic form in FIG. 12.

In FIG. 12, it may be seen that the heater elements 410 are connected through transformer 447 and commutators 448, 449, through a fuse 462 and a manual off-on switch 463 to a source of power. When the brushes from transformer 447 are in the conducting sector of commutators 448, 449, a complete electrical circuit is made. The main drive motor 464 is also connected to the power source through another manual off-on switch 463, a cam-operated safety switch 465 and a safety switch 466. The safety switch 466 is actuated by overtravel of the vertical standard 456. In the event that element is driven farther than is safe, switch 466 is actuated so as to remove all power from the apparatus. The cam-operated safety switch 465 operates in conjunction with a switch 467 and a switch 468. Switch 468 is placed near the upper end of the rack portion of the rack and pinion assembly 419 and switch 467 is disposed near the lower portion of the rack of rack and pinion assembly 452. Unless the racks are in their proper positions so as to close switches 467 and 468, respectively, power is removed from the main drive motor 464 when cam-operated switch 465 opens. This safety provision obviates a chance of damage to the machine in the event that either or both of the rack and pinion assemblies 452 and 419 are inoperative or out of position with respect to each other. The combination of cam-operated safety switch 465 and switches 467 and 468 also operates to control the voltage across switches 469 and 470. Switch 469, when actuated, operates a solenoid valve 471 which permits air from a high pressure cylinder 472 to actuate plunger 458, thereby connecting the vertical standard 456 to the lower table assembly 401. Switch 470, in turn, is actuated by the vertical standard 456 to reverse the flow of air through solenoid valve 471 to withdraw plunger 458 from the opening 460 in the lower table assembly 401, thus allowing spring 461 to return the vertical standard 456 to its original position. Switch 473 is actuated by the rack of rack and pinion assembly 452 to actuate solenoid valve 475, which allows high pressure air from source 472 to move plunger 450, opening the lower chuck through lever 451. At the same time, the closing of switch 473 actuates solenoid valve 476 so as to pass high pressure air from the source 472 under plunger 454 to retract that plunger. When the rack of rack and pinion assembly 452 moves upwardly, switch 473 opens and, when the rack reaches its upper limit, switch 474 is actuated. Actuation of this switch reverses the flow of air through solenoid valve 475 so as to retract plunger 450 to permit lever 451 to assume position for opening the next lower chuck. At the same time, switch 474 actuates solenoid valve 476 so as to force plunger 454 outwardly to actuate lever 455, thereby loosening the upper chuck holding the assembly which had previously been removed from the lower chuck. In the illustrated apparatus, loosening of the upper chuck in this manner causes the completed device to fall into chute 457.

When the cam-operated safety switch 465 and the switches 467 and 468 are operated properly, power is applied to the control device 436 so that it may operate as previously described. A reset switch 477 is actuated by a projection extending out of bearing box 422 by a pin (not shown) attached to a shaft 421 so that the control device is returned to its "ready" position each time the pressure between a whisker and semiconductor wafer is adjusted.

It will be appreciated by those skilled in the art that different materials may be used in following the invention. However, it has been found preferable to fabricate the semiconductor wafer from germanium and to use tungsten as the material for the whisker. Likewise, it has been found desirable to use lead-in wires fabricated from wire known in the art by the trade name "Dumet" in order to avoid excessive thermal strains between the lead-in wire and the glass beads. It is obvious, however, that any type of wire having a thermal coefficient of expansion substantially the same as the glass of the beads may be used. A preferred solution for pointing the end of the whisker which was mentioned generally hereinbefore, may be made by dissolving potassium hydroxide (45 lbs.) in demineralized water (8 gals.) until the specific gravity of the solution is between 1.367 and 1.377 at 70° F. Forty (40) milliliters of glycerine and 1690 milliliters of cupric chloride are then added slowly, mixing for about 30 minutes, then settling. The solution is then filtered and used. A solution such as this will wet the whisker so that etching of the point thereon will occur above the level of the solution as previously described.

While the foregoing description outlines a preferred embodiment of the invention, modifications will suggest themselves to those skilled in the art. The invention should not be restricted to the embodiment shown, but only by the spirit and scope of the appended claims.

What is claimed is:

1. Apparatus for forming a rectifying junction in a semiconductor device having a semiconductor wafer and a whisker therein comprising an upper and a lower chuck, said upper and said lower chuck being movably mounted opposing each other, means for moving said chucks in unison for transverse movement, said semiconductor wafer being held in said lower chuck and said whisker being held in said upper chuck, means for moving said upper chuck and said whisker toward said lower chuck and said semiconductor wafer in response to transverse movement until said whisker contacts said semiconductor wafer, means for then moving said lower chuck and said semiconductor wafer toward said upper chuck and said whisker in response to further transverse movement to generate a predetermined pressure between said whisker and said semiconductor wafer, and means for then passing a pulse of electrical current through said upper chuck and said whisker to said semiconductor wafer and said lower chuck to weld said whisker to said semiconductor wafer.

2. An apparatus for fabricating a rectifying junction between a whisker and a wafer of semiconducting material comprising an upper and lower table, means mounting said tables for rotation about a mutual vertical axis, at least one pair of upper and lower chucks, means mounting said upper and lower chucks on said upper and lower tables respectively for vertical movement with respect to said tables, actuating means to move a first one of said chucks towards its opposing chuck in response to movement of said tables about said vertical axis until a whisker held in one of said chucks contacts a wafer held in the other of said chucks, means to move said opposing chuck a predetermined distance towards said first chuck for producing a predetermined amount of pressure between said whisker and said wafer, and means to pass a pulse of electric current through said whisker and wafer to weld said whisker to said wafer.

3. An apparatus for fabricating a semiconductor device by forming a rectifying junction between a whisker and a wafer of semiconducting material within a vitreous envelope, said whisker and said wafer being assembled with bodies of vitreous material adapted to be formed into said envelope, said apparatus comprising an upper and lower table, means mounting said tables for rotation about a mutual vertical axis, a plurality of opposed upper and lower chucks, means mounting said upper and lower chucks on said upper and lower tables respectively for vertical movement with respect to said tables, actuating means to move a first one of said chucks towards its opposing chuck in response to movement of said tables about said vertical axis until a whisker held in one of said chucks contacts a wafer held in the other of said chucks, means to move said opposing chuck a predetermined distance towards said first chuck for producing a predetermined amount of pressure between said whisker and said wafer, means to pass a pulse of electric current through said whisker and wafer to weld said whisker to said wafer, and means to fuse said bodies of vitreous material to form a solid envelope for said whisker and wafer.

4. An apparatus for fabricating a semiconductor device by forming a rectifying junction between a whisker and a wafer of semiconducting material within a vitreous envelope, said whisker being mounted within a tubing of a vitreous material and said wafer ohmically connected to a lead-in wire having a bead of vitreous material formed thereon, said apparatus comprising an upper and lower table, means mounting said tables for rotation about a mutual vertical axis, a plurality of pairs of opposed upper and lower chucks, means mounting said upper and lower chucks on said upper and lower tables respectively for vertical movement with respect to said tables, actuating means to move a first one of said chucks towards its opposing chuck in response to movement of said tables about said vertical axis until a whisker held in one of said chucks contacts a wafer held in the other of said chucks, means to move said opposing chuck a predetermined distance towards said first chuck for producing a predetermined amount of pressure between said whisker and said wafer, adjustment means to selectively vary the predetermined distance said opposing chuck is moved, means to pass a pulse of electric current through said whisker and wafer to weld said whisker to said wafer, and means to fuse said bead to said tubing to form a solid envelope for said whisker and wafer.

5. Apparatus for forming a rectifying junction in a semiconductor device having a semiconductor wafer and a whisker therein comprising an upper and lower chuck, said upper and said lower chuck being movably mounted opposing each other, means for moving said chucks in unison for transverse movement, said semiconductor wafer being held in one of said chucks and said whisker being held in the other of said chucks, means for moving a first one of said chucks toward the second one of said chucks in response to transverse movement until said whisker contacts said semiconductor wafer, means for then moving the second one of said chucks toward the first one of said chucks in response to further transverse movement to generate a predetermined pressure between said whisker and said semiconductor wafer, and means for then passing a pulse of electric current between said chucks through said whisker and said semiconductor wafer to weld said whisker to said semiconductor wafer.

References Cited in the file of this patent

UNITED STATES PATENTS

| | | |
|---|---|---|
| 2,285,872 | Pearson | June 9, 1942 |
| 2,296,158 | Gardner | Sept. 15, 1942 |
| 2,430,028 | Pfann et al. | Nov. 4, 1947 |
| 2,469,470 | Mageoch | May 10, 1949 |
| 2,539,898 | Davis | Jan. 30, 1951 |
| 2,683,205 | Yanchenko | July 6, 1954 |
| 2,697,806 | Gates | Dec. 21, 1954 |
| 2,736,847 | Barnes | Feb. 28, 1956 |
| 2,757,440 | Carman | Aug. 7, 1956 |
| 2,823,809 | May | Feb. 18, 1958 |
| 2,829,782 | Roeber | Apr. 8, 1958 |
| 2,888,735 | Hanson | June 2, 1959 |